(12) United States Patent
Gissin et al.

(10) Patent No.: US 10,491,009 B2
(45) Date of Patent: Nov. 26, 2019

(54) PORTABLE CASE COMPRISING A RECHARGEABLE POWER SOURCE

(71) Applicant: Kalisaya Ltd., Yehud (IL)

(72) Inventors: Yaron Gissin, Yehud (IL); David Ben-Natan, Yehud (IL); Omer Har-Paz, Kibbutz Yizreel (IL); Eyal Eliav, Tel-Aviv (IL); Michal Barzilay-Gissin, Yehud (IL)

(73) Assignee: Kalisaya Ltd., Yehud (IL)

( * ) Notice: Subject to any disclaimer, the term of this patent is extended or adjusted under 35 U.S.C. 154(b) by 165 days.

(21) Appl. No.: 15/312,741

(22) PCT Filed: May 18, 2015

(86) PCT No.: PCT/IB2015/053643
§ 371 (c)(1),
(2) Date: Nov. 21, 2016

(87) PCT Pub. No.: WO2015/181673
PCT Pub. Date: Dec. 3, 2015

(65) Prior Publication Data
US 2017/0110896 A1    Apr. 20, 2017

Related U.S. Application Data

(60) Provisional application No. 62/002,928, filed on May 26, 2014.

(51) Int. Cl.
*H02J 7/00* (2006.01)
*H02J 7/34* (2006.01)
*H02J 7/35* (2006.01)

(52) U.S. Cl.
CPC .............. *H02J 7/0021* (2013.01); *H02J 7/34* (2013.01); *H02J 7/355* (2013.01); *H02J 7/0013* (2013.01);
(Continued)

(58) Field of Classification Search
CPC ..................................................... H02J 7/0027
(Continued)

(56) References Cited

U.S. PATENT DOCUMENTS 5,565,756 A    10/1996  Urbish et al.
5,847,539 A    12/1998  Akiya
(Continued)

FOREIGN PATENT DOCUMENTS

EP    2512002 A2    10/2012
WO    2012167974 A1  12/2012

*Primary Examiner* — Jerry D Robbins
(74) *Attorney, Agent, or Firm* — Gable Gotwals

(57) ABSTRACT

This invention relates to a portable case including a processor configured to control the portable case; a charging port; at least one output port; an adjustable energy storage system further including a battery printed circuit board (BPCB) including a plurality of battery packs connectors; and a central battery management microprocessor (CBMM); and a plurality of battery packs configured to be connected to the plurality of battery packs connectors and to provide power to electronic appliance connected to the at least one output port; a user interface configured to enable powering and monitoring of the portable case; and a recharging element, carryable by the portable case, the recharging element configured to be connected to the charging port and recharge at least one of the plurality of battery packs.

23 Claims, 11 Drawing Sheets

(52) U.S. Cl.
CPC ..... *H02J 7/0044* (2013.01); *H02J 2007/0096* (2013.01)

(58) Field of Classification Search
USPC .......................................................... 320/101
See application file for complete search history.

(56) References Cited

U.S. PATENT DOCUMENTS

| | | | |
|---|---|---|---|
| 6,650,085 B2* | 11/2003 | Lau | H01M 10/44 320/101 |
| 6,806,684 B2 | 10/2004 | Matsuyama | |
| 6,870,089 B1 | 3/2005 | Gray | |
| 7,565,968 B2* | 7/2009 | Lindley | A62B 99/00 206/223 |
| 7,884,502 B2* | 2/2011 | Lyman | H01M 2/1022 136/244 |
| 2008/0196758 A1* | 8/2008 | McGuire | F03D 9/007 136/245 |
| 2008/0283114 A1* | 11/2008 | Gray | G06F 1/1628 136/245 |
| 2009/0102415 A1* | 4/2009 | Muchow | F03D 9/007 320/101 |
| 2009/0295234 A1 | 12/2009 | Lu et al. | |
| 2011/0062911 A1 | 3/2011 | Lloyd et al. | |
| 2011/0181242 A1* | 7/2011 | Lee | H02J 7/0003 320/110 |
| 2011/0199041 A1 | 8/2011 | Yang | |
| 2012/0281392 A1 | 11/2012 | Workman et al. | |
| 2013/0020874 A1* | 1/2013 | Ayotte | H02J 1/10 307/66 |
| 2013/0106353 A1* | 5/2013 | Foster | H02J 7/0044 320/114 |
| 2015/0067362 A1* | 3/2015 | Sultenfuss | G06F 1/3296 713/320 |

\* cited by examiner

PORTABLE CASE COMPRISING A RECHARGEABLE POWER SOURCE

CROSS-REFERENCE TO RELATED APPLICATIONS

This United States application is the National Phase of PCT Application No. PCT/IB2015/053643 filed 18 May 2015, which claims priority to U.S. Provisional Patent Application No. 62/002,928 filed 26 May 2014, each of which is incorporated herein by reference.

FIELD OF THE INVENTION

The subject matter relates generally to a portable and durable case for charging electrical appliances or providing electricity for electric devices.

BACKGROUND OF THE INVENTION

The prevailing use of electronic devices, such as mobile devices, computers, and the like, requires always being near a rechargeable power source to recharge the electronic equipment. As such, airports and other transportation stations have charging centers, which allow a user of an electronic device to charge the electronic device while on the move. Private vehicles have a place to connect electronic devices to be charged while driving.

To handle the ever growing need to access a convenient and rechargeable power source consumer products are being produced to have solar panels or other sources of natural energy that enable charging electronic devices without having to search for an electronic plug in the wall or a charging station.

The need for portable stored energy is further enhanced by the unfortunate uptake of natural disasters, such as hurricanes, earthquakes, tsunamis, that cause people around the globe to be literally left in the dark, since, in most cases, the first resource to suffer damage in such events is the electric power supply.

One of the main challenges of obtaining energy from solar panels, is that such solar panels need to be large in size, and precisely directed towards the sun in order to provide reasonable charging.

SUMMARY

According to an aspect of the present invention there is provided a portable case, comprising: a processor configured to control the portable case, a charging port, at least one output port, an adjustable energy storage system comprising: a battery printed circuit board (BPCB) comprising: a plurality of battery packs connectors, and a central battery management microprocessor (CBMM), and a plurality of battery packs configured to be connected to the plurality of battery packs connectors and to provide power to electronic appliances connected to the at least one output port, a user interface configured to enable powering and monitoring of the portable case, and a recharging element, carryable by the portable case, the recharging element configured to be connected to the charging port and recharge at least one of the plurality of battery packs.

The electronic appliances may comprise at at least one of smartphone, tablet, laptop, mobile device, PDA, emergency beacon and Wi-fi router.

The at least one output port may comprise at least one of USB port and 12V port.

The portable case may further comprise a communication unit.

The communication unit may comprise a Bluetooth transceiver.

The communication unit may comprise a Wi-Fi transceiver.

The Bluetooth transceiver may be configured to enable a mobile device running a user application to at least one of receive information regarding the portable case and control the portable case.

The Wi-Fi transceiver may be configured to at least one of receive information regarding the portable case, create a cellular Wi-Fi hot-spot and control the portable case.

The user application may further be configured to instruct a user how to place the recharging element.

The portable case may further comprise an emergency beacon configured to at least one of transmit an emergency signal and activate a light.

The at least one of the battery packs may be rechargeable and the recharging element may comprise at least one solar panel configured to recharge the at least one rechargeable battery packs using solar power.

The portable case may further comprise at least one universal fixture for aligning the at least one solar panel at an optimal angle towards the sun.

The at least one solar panel may be foldable.

The at least one of the battery packs may be rechargeable and the recharging element may comprise at least one wind turbine configured to recharge the at least one rechargeable battery packs using wind power.

The portable case may further comprise a turbine fixture configured to enable placing the wind turbine at adjustable heights and withstanding strong winds.

The at least one wind turbine may further comprise a handle configured to enable rotating the wind turbine manually.

The at least one of the battery packs may be rechargeable and the recharging element may comprise at least one hand-crank generator configured to recharge the at least one rechargeable battery packs.

The plurality of batteries may be configured to be added and removed from the portable case as needed.

The CBMM may be configured to at least one of:
identify whether a rechargeable battery pack is connected to any of the connectors.
receive a signal reading the battery level of each rechargeable battery pack connected to the connectors.
calculate an average battery packs level.
identify each battery pack's type.
decide which battery packs to recharge.
receive alerts from the battery packs.

The alerts may comprise at least one of short circuit, overheat, overcharge and over-discharge.

According to another aspect of the present invention there is provided a portable case, comprising: a processor configured to control the portable case, a charging port, at least one output port, a rechargeable power source configured to provide power to electronic appliances connected to the at least one output port, a communication unit configured to enable data transfer from the portable case to a user application running on a mobile communication device, a user interface configured to enable powering and monitoring of the portable case, and a recharging element, carryable by the portable case, the recharging element configured to be connected to the charging port and recharge the rechargeable power source.

The electronic appliances may comprise at at least one of smartphone, tablet, laptop, mobile device, PDA, emergency beacon and Wi-fi router.

The at least one output port may comprise at least one of USB port and 12V port.

The communication unit may comprise a Bluetooth transceiver.

The communication unit may comprise a Wi-Fi transceiver configured to create a cellular Wi-Fi hot-spot.

The communication unit may further be configured to enable a user to control the portable case via the user application.

The user application may further be configured to instruct a user how to place the recharging element.

The portable case may further comprise an emergency beacon configured to at least one of transmit an emergency signal and activate a light.

The recharging element may comprise at least one solar panel configured to recharge the rechargeable power source using solar power.

The portable case may further comprise at least one universal fixture for aligning the at least one solar panel at an optimal angle towards the sun.

The at least one solar panel may be foldable.

The recharging element may comprise at least one wind turbine configured to recharge the rechargeable power source using wind power.

The portable case may further comprise a turbine fixture configured to enable placing the wind turbine at adjustable heights and withstanding strong winds.

The at least one wind turbine may further comprise a handle configured to enable rotating the wind turbine manually.

The recharging element may comprise at least one hand-crank generator configured to recharge the rechargeable power source.

According to another aspect of the present invention there is provided an adjustable energy storage system, comprising: a battery printed circuit board (BPCB) comprising: a plurality of battery packs connectors, and a central battery management microprocessor (CBMM), and a plurality of battery packs configured to be connected to the plurality of battery packs connectors, wherein the BPCB is configured to: enable connection of rechargeable and non rechargeable battery packs, identify which of the battery packs are rechargeable, and enable recharging of the rechargeable battery packs.

The each of the plurality of battery packs may comprise a Battery Management System (BMS) configured to hold information regarding the battery pack.

The information may comprise a battery pack type.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION

Figure 1:
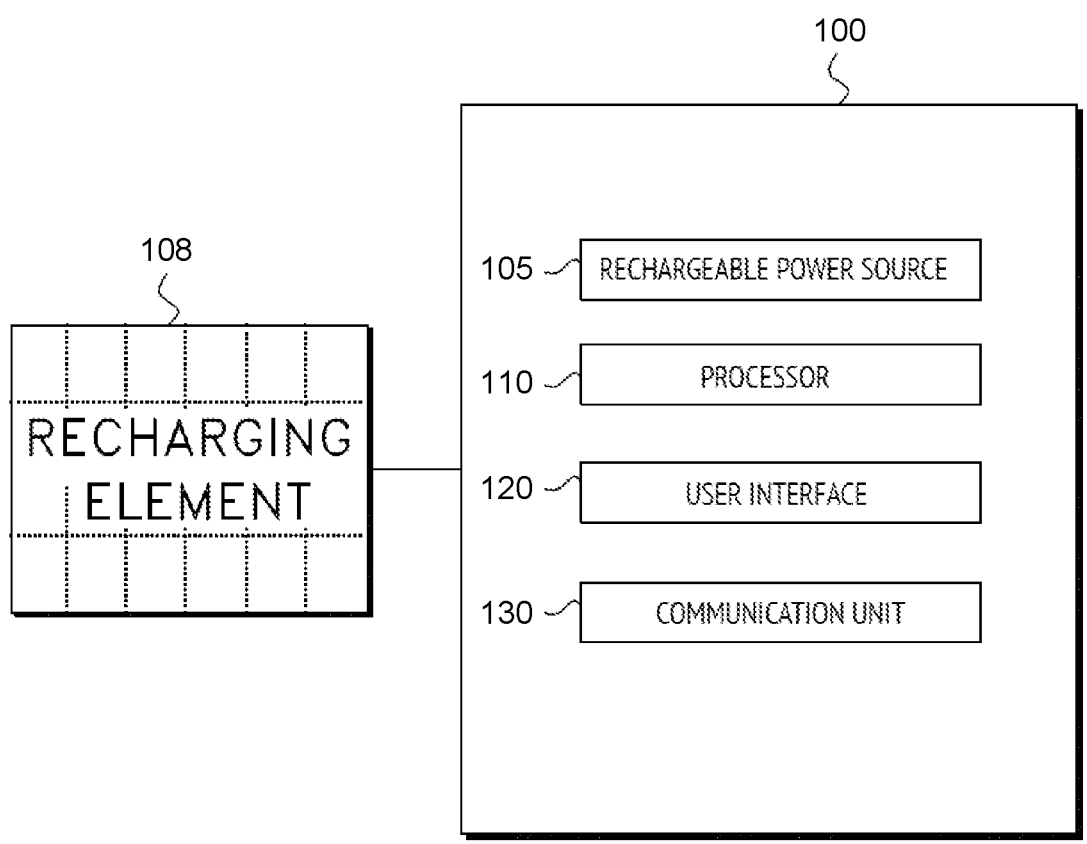
FIG. 1 shows schematic representation of a system of a portable case, according to some exemplary embodiments of the subject matter.

The subject matter discloses a portable and durable case for charging electrical appliances or providing electricity for various electronic appliances such as a lighting device for example, according to exemplary embodiments. The portable case is compact and integrated with components stored inside the portable case. The portable case is durable and water resistant. The compactness of the portable case enables easily carrying the portable case. For example, the portable case may have dimensions of 15.5"×15.5"×6". The portable case contains a rechargeable power source to enable charging or energizing electronic appliances, such as mobile devices, laptops, tablets, satellite phone, or the like. The power source may also provide electricity to activate a small refrigerator or lighting fixtures, such as a LED light projector. The portable case may comprise a recharging element, which recharges the rechargeable power source. The recharging element uses natural energy resources to provide the energy to recharge the rechargeable power source. For example, the recharging element may be a solar panel, a wind turbine, a hand-crank generator, an external adaptor, or a combination thereof. The recharging element may be collapsible to enable easy and compact storage inside the portable case.

Alternatively, the rechargeable power source may be recharged by a vehicle, generator, grid, etc.

In some exemplary embodiments of the subject matter, the recharging element is a solar panel that is foldable and expandable for maximum exposure and absorption of light. The solar panel may be attached to a universal fixture for aligning the solar panel in whichever direction the sun is located in the sky. The universal fixture enables stretching and positioning the solar panel as a flat surface leaning against the universal fixture, of two crossed arches made of elastic stems that are pinned into the corners of the universal fixture. The universal fixture enables placing the solar panel at an optimal angle towards the sun.

In some non-limiting embodiments, the wind turbine is a foldable wind turbine, which makes the wind turbine compact and storable in a portable case. For example, the wind turbine comprises three wings that may be expanded or folded, and a unique tripod to hold the wind turbine erect for optimal wind charging and sustainable at even strong winds.

In some exemplary embodiments of the subject matter, the portable case comprises a hand-crank generator, which enables manual charging of the rechargeable power source. For example, the hand-crank is rotated at a predetermined speed to create power that charges the rechargeable power source.

In some exemplary embodiments of the subject matter, the portable case comprises a router, which enables creating a Wi-Fi hot-spot. The router provides wireless services to nearby electronic mobile devices such as cellular telephones, laptops, tablets, or the like.

In some exemplary embodiments of the subject matter, the portable case comprises a Bluetooth and/or Wi-Fi transmitter/transceiver, which enables connecting via Bluetooth and/or Wi-Fi technology to a nearby mobile device, such as a smartphone. The Bluetooth and/or Wi-Fi transmitter/transceiver transmits to the mobile device certain data related to the state of the power source and power usage of the portable case. For example, the portable case may transfer data informing a user of the mobile device which electric appliances are connected to the portable case, the amount of electricity each electrical appliance of the electrical appliances is consuming, whether the recharging element is connected to the portable case, the power source's status, alert when an error occurs, the amount of power the recharging element generates, etc. The data is then displayed in a mobile application downloadable to the mobile device by the user of the mobile device.

According to some exemplary embodiments of the subject matter, the user application may provide the user instructions regarding how to place the solar panel in the optimal direction and/or angle. For example, while the user is moving the panel he may view the influence of changing the direction and/or angle of the panel in real time, e.g. by an increasing and decreasing bar displaying on his device's display. The higher the bar, the better the charging.

In some exemplary embodiments of the subject matter, the portable case comprises an emergency beacon. The emergency beacon may be a mini-transmitter that is activated during an emergency situation such as for example a post-earthquake situation. The emergency beacon transmits when the battery decreases below a predetermined level.

The portable case comprises a user interface that enables monitoring a rechargeable power source level. In some non-limiting embodiments, the user interface is a graphic user interface ("GUI"). The GUI may display which electronic appliances are connected to the rechargeable power source and charging. In some exemplary embodiments of the subject matter the GUI comprises an illumination component, such as an LED lights matrix that presents information, to enable a user of the portable case to view the GUI in the dark.

FIG. 1 shows schematic representation of a system of a portable case, according to some exemplary embodiments of the subject matter. The portable case 100 comprises a rechargeable power source 105 which provides power for various components of the portable case 100 and a processor 110, which controls the performance of the electronic components of the portable case 100. The processor 110 regulates power supplied by the rechargeable power source for charging and/or powering various electronic appliances. The rechargeable power source 105 is connected to a recharging element 108, which is used to recharge the rechargeable power source 105.

The portable case 100 further comprises a user interface 120, which enables a user of the portable case 100 to manage the activities of the portable case 100.

For example, the user interface 120 may show the user of the portable case 100 which electronic appliances are charged and/or powered by the portable case 100, the available power in the rechargeable power source 105 and additional parameters that are relevant.

The portable case 100 further comprise a communication unit 130, which may comprise Bluetooth and/or Wi-Fi transmitters/transceivers. The Wi-Fi transmitter/transceiver enables creating a cellular Wi-Fi hotspot. The cellular Wi-Fi hotspot enables nearby mobile devices to use wireless services such as internet and e-mail access. The Bluetooth transmitter/transceiver enables connecting the portable case 100 to a mobile device, such as a smartphone. The Bluetooth transmitter/transceivers transmits to the mobile device certain data related to the state of the power source and power usage of the portable case. For example, the portable case 100 may transfer data informing a user of the mobile device which electric appliances are connected to the portable case, the amount of electricity each electrical appliance of the electrical appliances is consuming, whether the recharging element is connected to the portable case, the power source's status, alert when an error occurs, the amount of power the recharging element generates, etc. The data is then displayed in a mobile application downloadable to the mobile device by the user of the mobile device.

According to some exemplary embodiments of the subject matter, the Bluetooth and/or Wi-Fi transceivers may enable a user to control the portable case of the present invention from the user application running on the user's mobile device. For example, enable/disable at least one of the output ports, determine a discharge level in order to extend battery life by preventing deep discharge cycles, turn the portable case ON/OFF, activate the emergency beacon, etc.

For the purpose of turning the portable case ON via the application, at least one of the transceivers (Bluetooth/Wi-Fi) may be configured to stay in a low energy mode in order to be able to receive the command.

According to some exemplary embodiments of the subject matter, instead of an integrated Wi-Fi transmitter/transceiver a standalone Wi-Fi router may be carried in the portable case. The router may be connected directly or via a cable to the portable case in order to receive its power and performed as a Wi-Fi hotspot.

Figure 2:
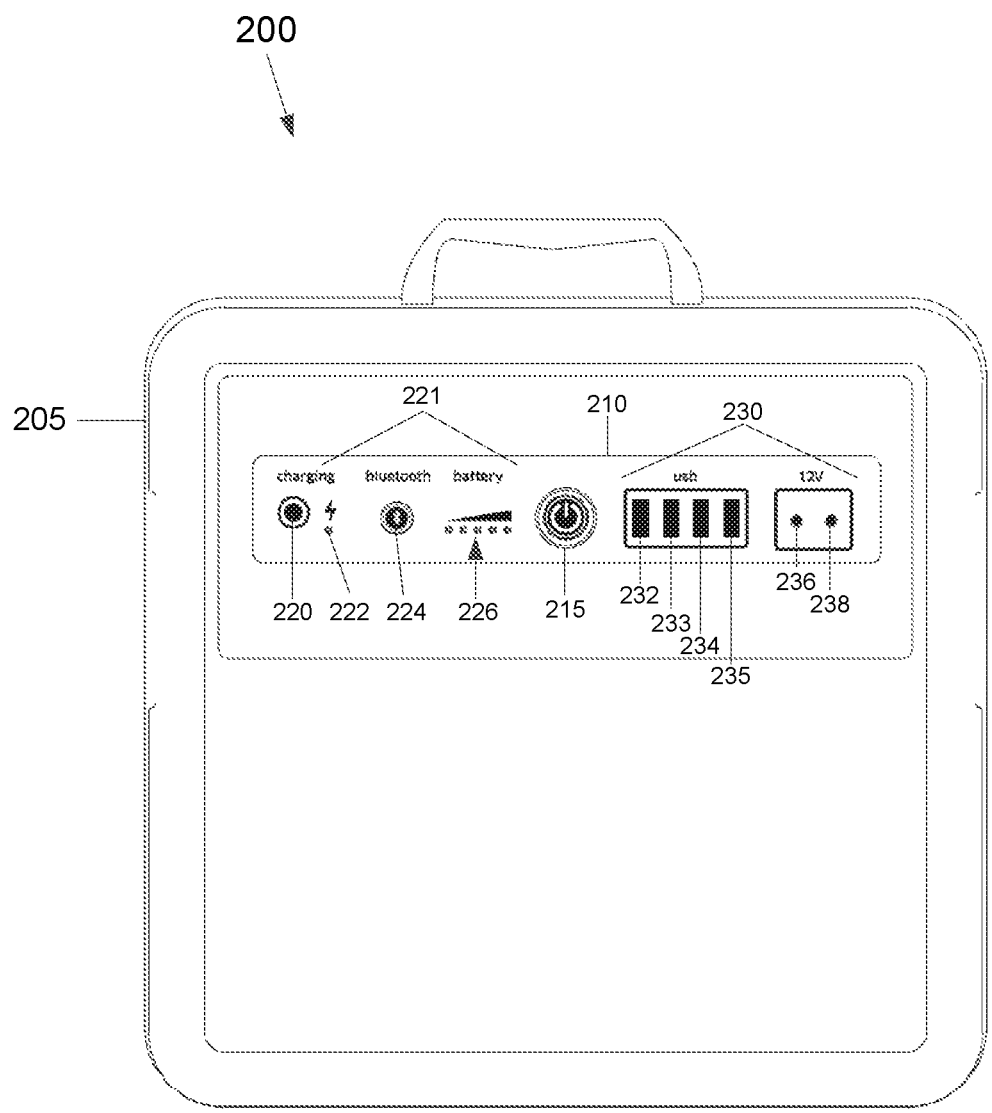
FIG. 2 shows a portable case, according to some exemplary embodiments of the subject matter.

FIG. 2 shows a portable case, according to some exemplary embodiments of the subject matter. The portable case 200 comprises an external cover 205, which encases the internal components of the portable case 200. In some cases, the external cover 205 may be rigid to prevent damage to the internal components. In other cases, the external cover 205 may be elastic and enables consumption of less space when storing the portable case 200. The portable case 200 comprises a user interface 210, (120 of FIG. 1) which enables a user of the portable case 200 to monitor the use of components of the portable case 200. The user interface 210 comprises a power button 215, which enables the user of the portable case 200 to activate the portable case 200. The user interface 210 comprises a charging port 220, which enables the user of the portable case to connect a charging element (108 of FIG. 1) in order to charge the portable case 200. According to some exemplary embodiments of the subject matter, the user interface 210 comprises a display 221, which shows what electronic components are active. For example, the display 221 may comprise a charging display 222 and a rechargeable power source display 226. The charging display 222 shows that the portable case 200 is being charged. The rechargeable power source display 226 shows the amount of power remaining in the rechargeable power source 105 of FIG. 1. The rechargeable power source display 226 may inform the user of the portable case 200 when the rechargeable power source requires recharging.

According to some exemplary embodiments of the subject matter, the display 221 further comprises a Bluetooth button 224, which enables the user of the portable case 200 to activate/diactivate the Bluetooth transmitter. The button 224 blinks when searching for a connection and illuminates constantly when a connection is made.

The user interface 210 further comprises output ports 230, for connecting different components to the portable case 200. The output ports 230 are connected to the rechargeable power source 105 of FIG. 1, which enables charging and powering electronic appliances that are connectable to the portable case 200. For example, the output ports 230 may comprise four USB ports 232-235, and two 12V charging outlets 236 and 238. The output ports 230 enable connecting various appliances, for example, the USB ports 232-235 enable connecting iPads, mp3 players, mobile devices, etc. to the portable case 200. The 12V charging outlets 236 and 238 enable connecting appliances such as a laptop computer, an electric shaver, a portable lamp, etc. to the portable case 200. The connection to the 12V outlet may be done via a suitable adapter.

It will be appreciated that any combination of at least one USB port and/or at least one 12V outlet is possible.

Figure 2A:
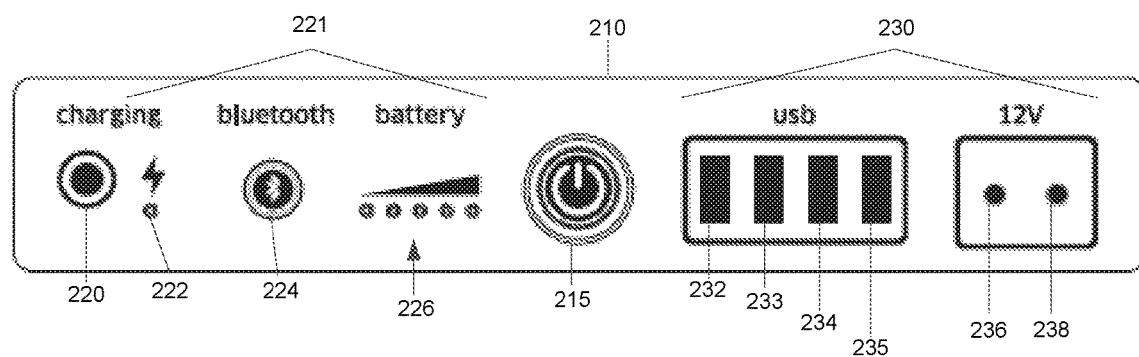
FIG. 2A is an enlargement of the user interface of FIG. 2.

FIG. 2A is an enlargement of the user interface 210 of FIG. 2.

Figure 3:
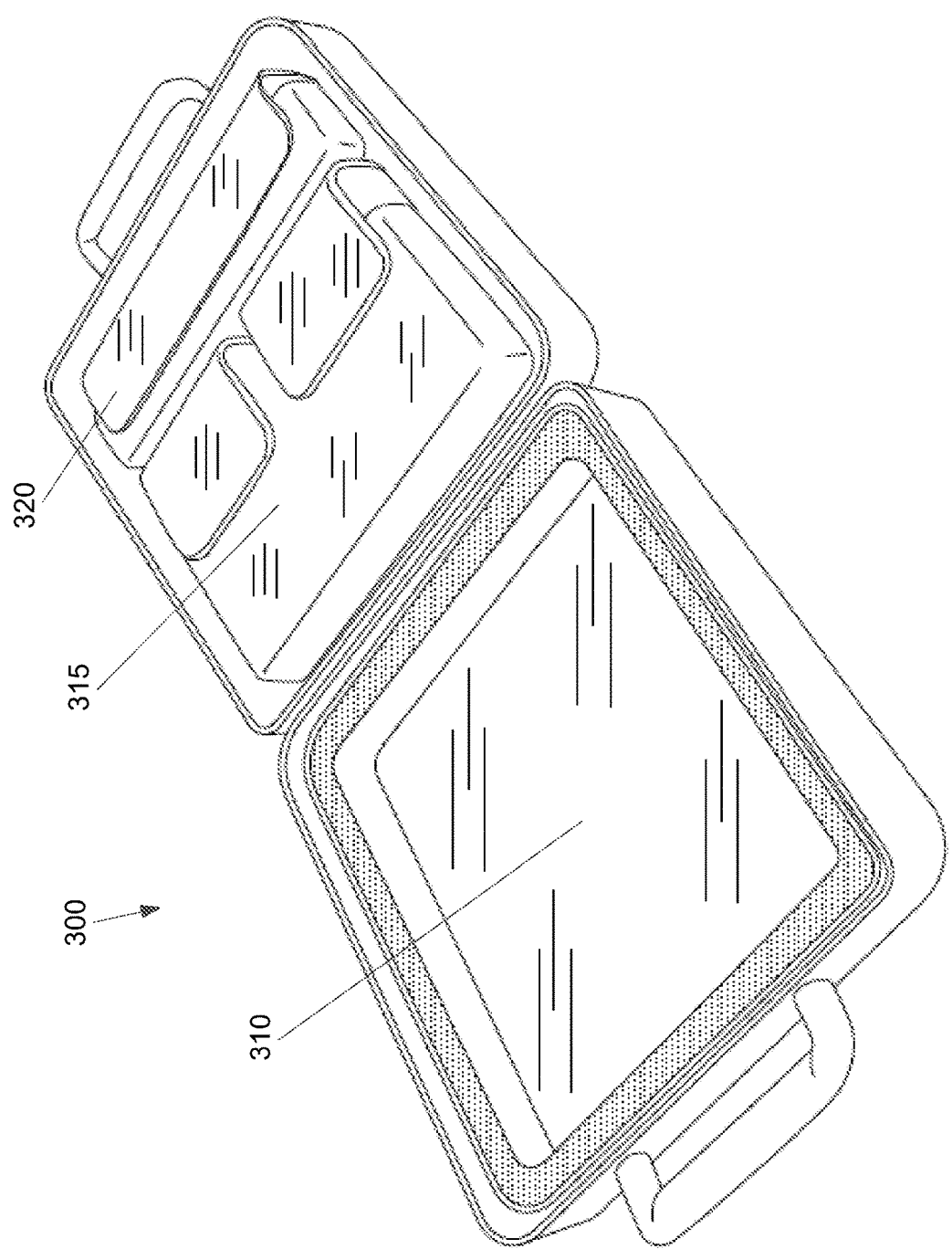
FIG. 3 shows a portable case interior, according to some exemplary embodiments of the subject matter.

FIG. 3 shows a portable case interior, according to some exemplary embodiments of the subject matter. The portable case 300 comprises the portable case interior 310, to enable storage of personal belongings 315 and electronic components 320 of the portable case 300 such as for example a router, portable lamp, etc. Adapters and/or connectors may also be provided in the portable case 300. The interior 310 may also be configured to enable storage of a recharging element such as a solar panel, wind turbine, etc.

Figure 4:
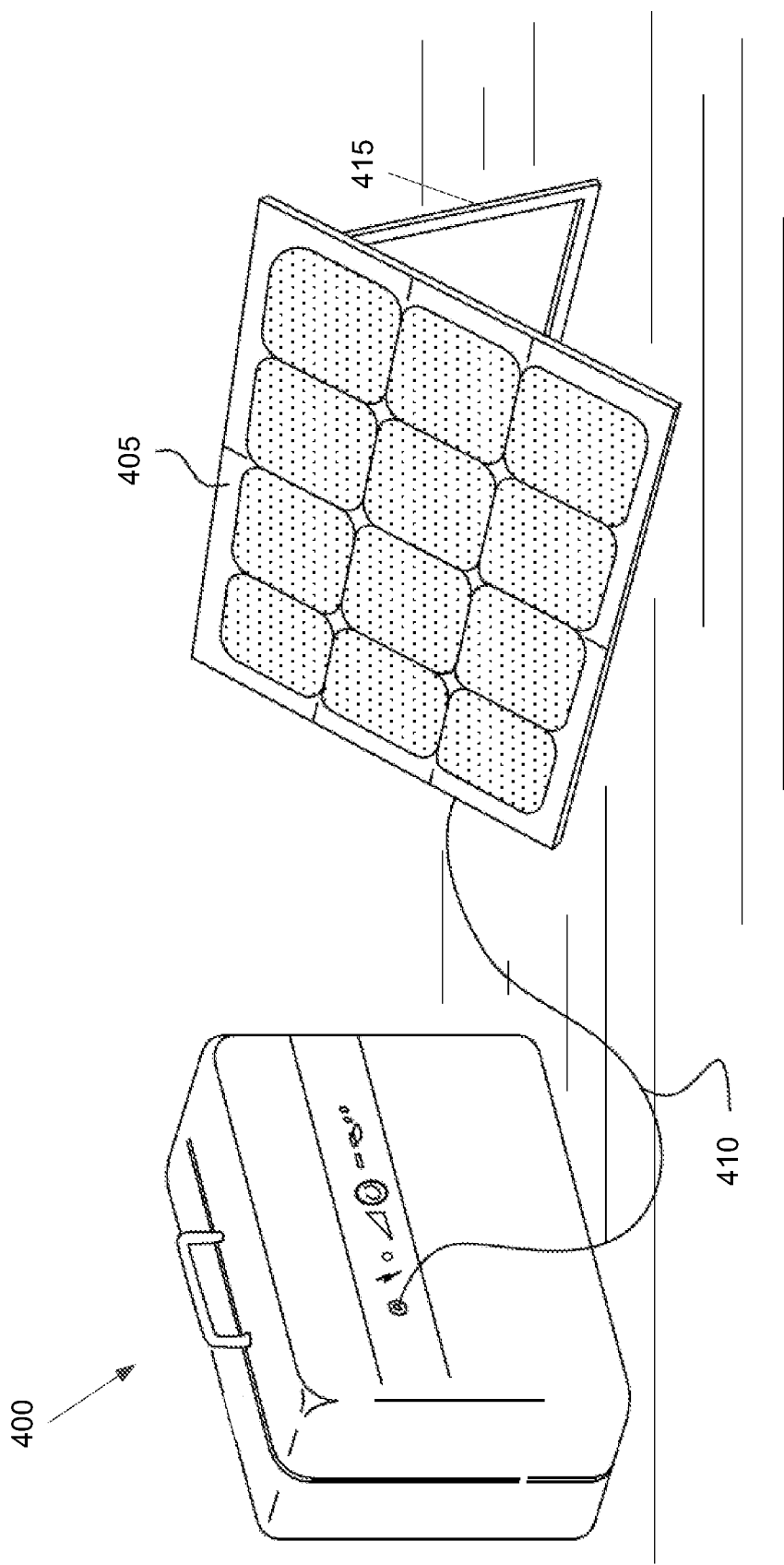
FIG. 4 shows a portable case comprising a solar panel, according to some exemplary embodiments of the subject matter.

FIG. 4 shows a portable case comprising a solar panel, according to some exemplary embodiments of the subject matter. The portable case 400 comprises the recharging element 108 of FIG. 1, which is the solar panel 405. The solar panel 405 is connected to the charging port of the portable case 400 by an extendable cord 410. The solar panel 405, when unfolded, is affixed onto a universal fixture 415, which enables aligning the solar panel 405 at an optimal angle with the sun for collecting solar power. For example, arranging the universal fixture 415 such that the solar panel 405 is arranged at a thirty degree angle in a southeast direction for optimal charging.

Figure 5:
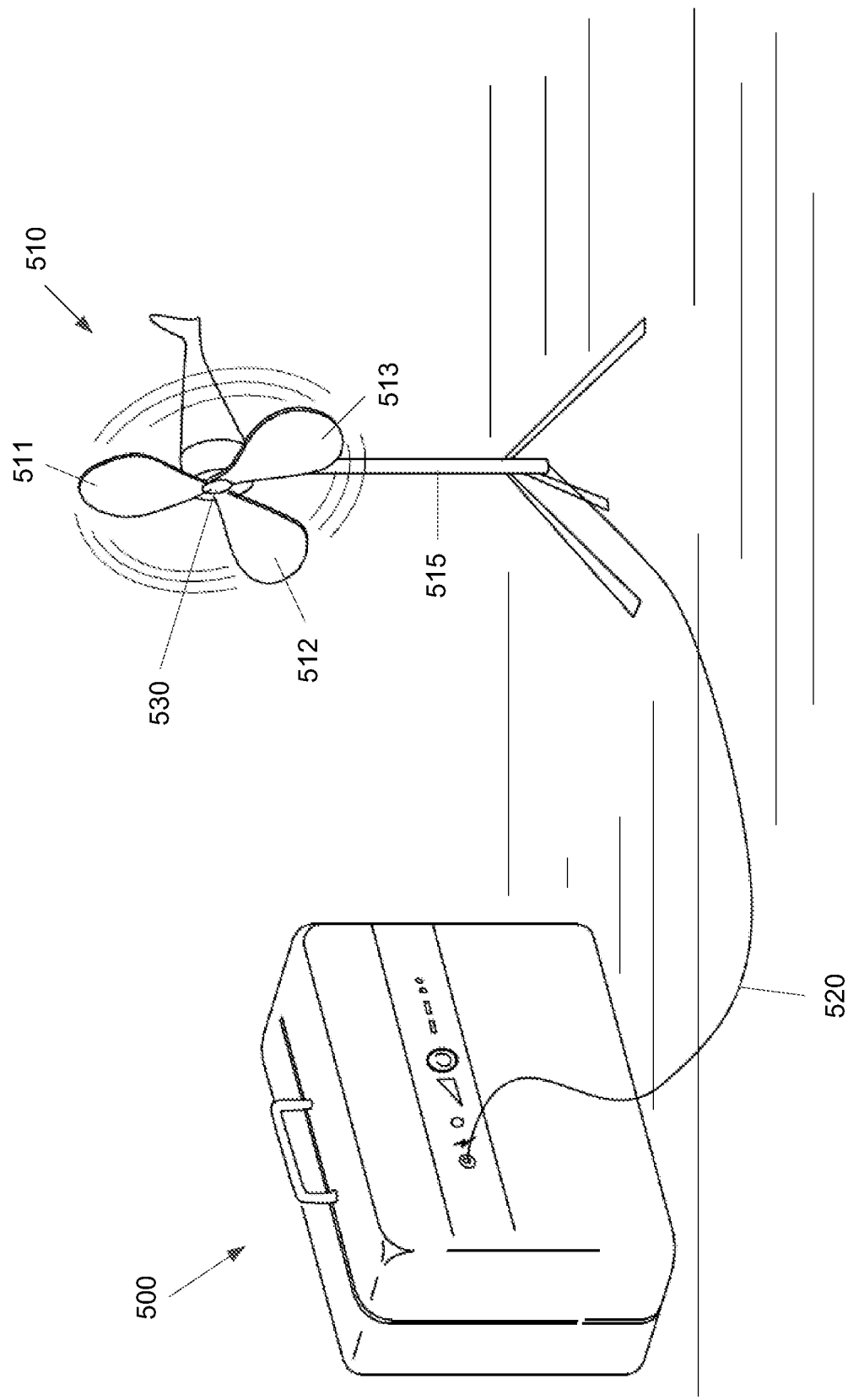
FIG. 5 shows a portable case comprising a wind turbine, according to some exemplary embodiments of the subject matter.

FIG. 5 shows a portable case 500 comprising a wind turbine 510, according to some exemplary embodiments of the subject matter. The portable case 500 comprises the recharging element 108 of FIG. 1, which is the wind turbine 510. The wind turbine 510 is connected to the charging port of the portable case 500 by an extendable cord 520. The wind turbine 510 comprises one or more fins, for example a first fin 511, a second fin 512, and a third fin 513. The wind pushes the one or more fins, which enables the wind turbine 510 to collect wind power from the force caused when the wind pushes against the one or more fins. The energy is used to recharge the rechargeable power source 105 of FIG. 1. The wind turbine 510 may be affixed to a turbine fixture 515, which enables placing the wind turbine 510 at adjustable heights and to withstand strong winds. Adjusting the heights enables placing the wind turbine 510 at the optimal height for maximum wind use. According to embodiments of the invention, the wind turbine, including all of its parts, the turbine fixture and the tripod—all collapse into the portable case of the present invention or into a folded structure, easy to carry with an enclosing compartment with shoulder straps.

According to some exemplary embodiments of the subject matter, the wind turbine may comprise a handle (not shown) connected to the center of the wind turbine (530). The handle having a grip is configured to enable a user to manually rotate the wind turbine 510 in order to recharge the rechargeable power source 105 of FIG. 1.

Figure 6:
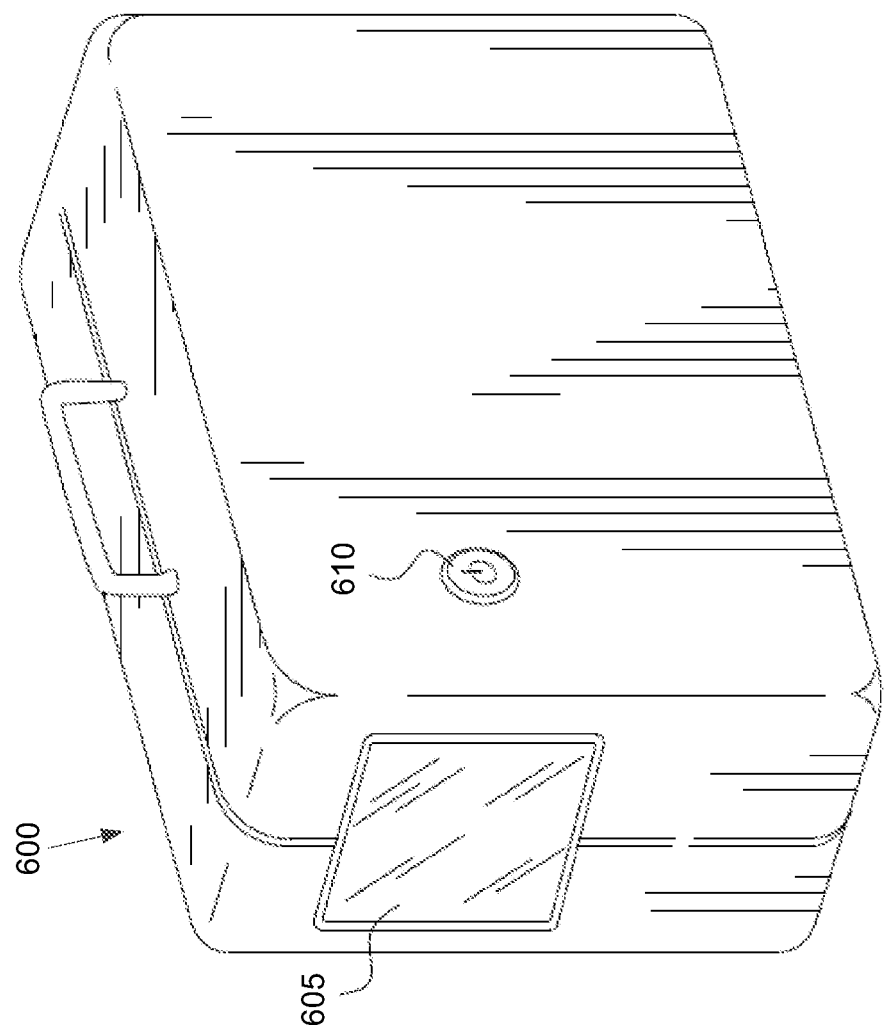
FIG. 6 shows an emergency beacon of a portable case, according to some exemplary embodiments of the subject matter.

FIG. 6 shows an emergency beacon of a portable case, according to some exemplary embodiments of the subject matter. The emergency beacon 605 is connected to the rechargeable power source 105 of FIG. 1. The emergency beacon 605 may be configured to turn on when the rechargeable power source 105 has low energy and the user of the portable case 600 does not recharge the rechargeable power source 105. In some exemplary embodiments of the subject matter, the user of the portable case 600 may activate the emergency beacon 605 by pressing an activation button 610 located on the portable case 600, for example the activation button 610 may be located in a user interface (such as 210 of FIG. 2). The emergency beacon 605 may be in the form of an LED that blinks and shines to enable rescuers to see the emergency beacon light and come assist the user of the portable case 600. In some cases, the emergency beacon 605 may be a radio transceiver that broadcasts an emergency radio signal that enables nearby authorities to locate the user.

Figure 7:
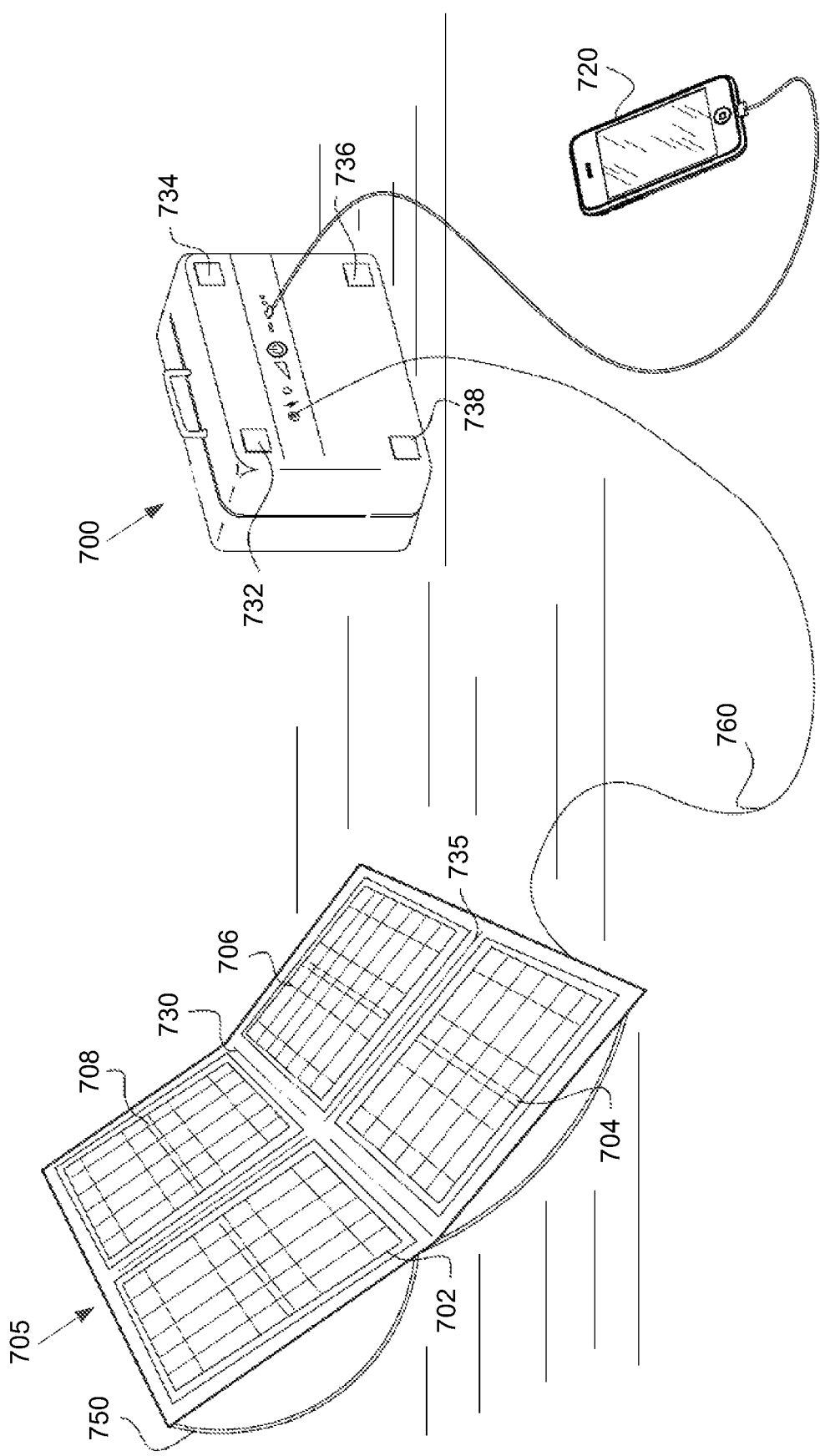
FIG. 7 shows a solar panel connected to a portable case, according to some exemplary embodiments of the subject matter.

FIG. 7 shows a solar panel 705 connected to a portable case 700, according to some exemplary embodiments of the subject matter. The solar panel 705 may comprise one or more collection panels, for example, a first panel 702, a second panel 704, a third panel 706, and a fourth panel 708. The one or more panels are aligned in a geometric alignment that enables folding of the solar panel 705 for easy compartmenting. For example, the solar panel comprises a horizontal folding line 730 and a vertical folding line 735 that are located between the one or more panels and enable folding the solar panel 705. The solar panel 705 may be affixed to a universal fixture 750, which enables aligning the solar panel 705 at an optimal angle towards the sun for optimal collection of solar energy. The universal fixture 750 may be from flexible rods that enable the universal fixture 750 to be foldable along with the solar panel 705. The universal fixture 750 may comprise flexible rods that are bent to enable the solar panel 705 to be rotatable so as to arrange the solar panel 705 at the optimal angle.

The solar panel 705 is connected to the charging port of the portable case 700. According to some exemplary embodiments of the subject matter, the portable case 700 may comprise one or more lights, such as LED lights, that provide light when no other light source may be available. For example, the portable case 700 may comprise a first LED light 732, a second LED light 734, a third LED light 736, and a fourth LED light 738. The one or more lights may be activated by engaging a button on the user interface 210 of FIG. 2. In some exemplary cases, the one or more lights may be automatically activated by the portable case 700 when a sensor (not shown) on the portable case 700 detects that light detected by the sensor is below a predetermined quantity. The one or more lights are powered by the power source 105 of FIG. 1. Smartphone 720 is shown to demonstrate a device being charged by the portable case 700.

Figure 8:
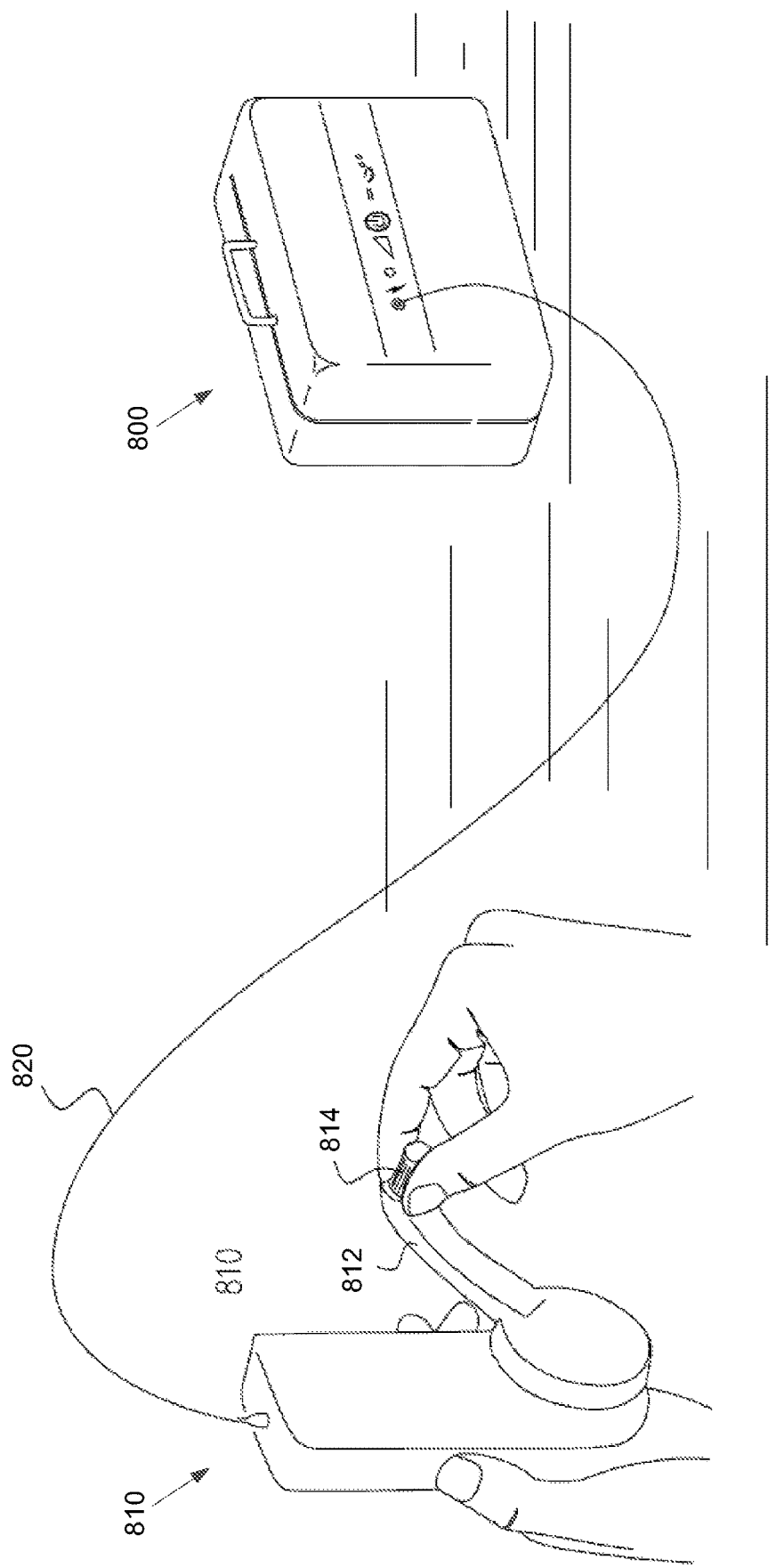
FIG. 8 shows a portable case comprising a hand-crank generator, according to exemplary embodiments of the subject matter.

FIG. 8 shows a portable case 800 comprising a hand-crank generator 810, according to exemplary embodiments of the subject matter. The hand-crank generator 810 comprises a handle 812 and a grip 814, which enables charging the hand-crank generator 810. A user of the hand-crank generator 810 holds the grip 814 and rotates the handle 812 to create power from the rotation of the handle 812. The longer the handle 812 is cranked, the more power is produced by the hand-crank generator 810. The hand-crank generator 810 is connected to the charging port of the portable case 800 by an extendable cable 820. The power created by the hand-crank generator 810 charges the rechargeable power source 105 of FIG. 1.

According to some exemplary embodiments of the subject matter, the portable case may comprise a modular and adjustable Energy Storage System (ESS). The ESS enables a user to configure the amount of energy the portable case can store. The ESS may use more than one battery pack (power source 105), e.g. 70-99 watts-hour each and enables some unique usage patterns and features:
1. Extended amount of energy storage (up to 1.2 Kwh)—for extended energy storage usage (i.e.—in lengthy stays off-the-grid and when solar charging is not sufficient or non-existent)
2. Easy "snap-in" and "snap-out" of the modular battery packs—for easy adjustment of amount of energy carried. The user may choose to add or remove battery pack(s) as necessary.
3. Compatibility with UN Hazardous materials regulations and International Air Transport Association (IATA) regulation for transporting of lithium-Ion batteries (when configuring the case to carry only one battery pack of 100 wh)
4. The Modular architecture of the case, through the replaceable battery packs, allows users extended usage of the entire system independently.
5. Supporting hot-swap replacement of battery packs while external loads consume power (as long as another battery pack is still attached) hence providing uninterrupted DC power to external loads.
6. May enable attaching a combination of various battery packs types (rechargeable and non-rechargeable), battery packs chemistry and battery packs capacity.
7. Provide inherent redundancy in case that one of the battery packs fails or is exhausted.

Figure 9:
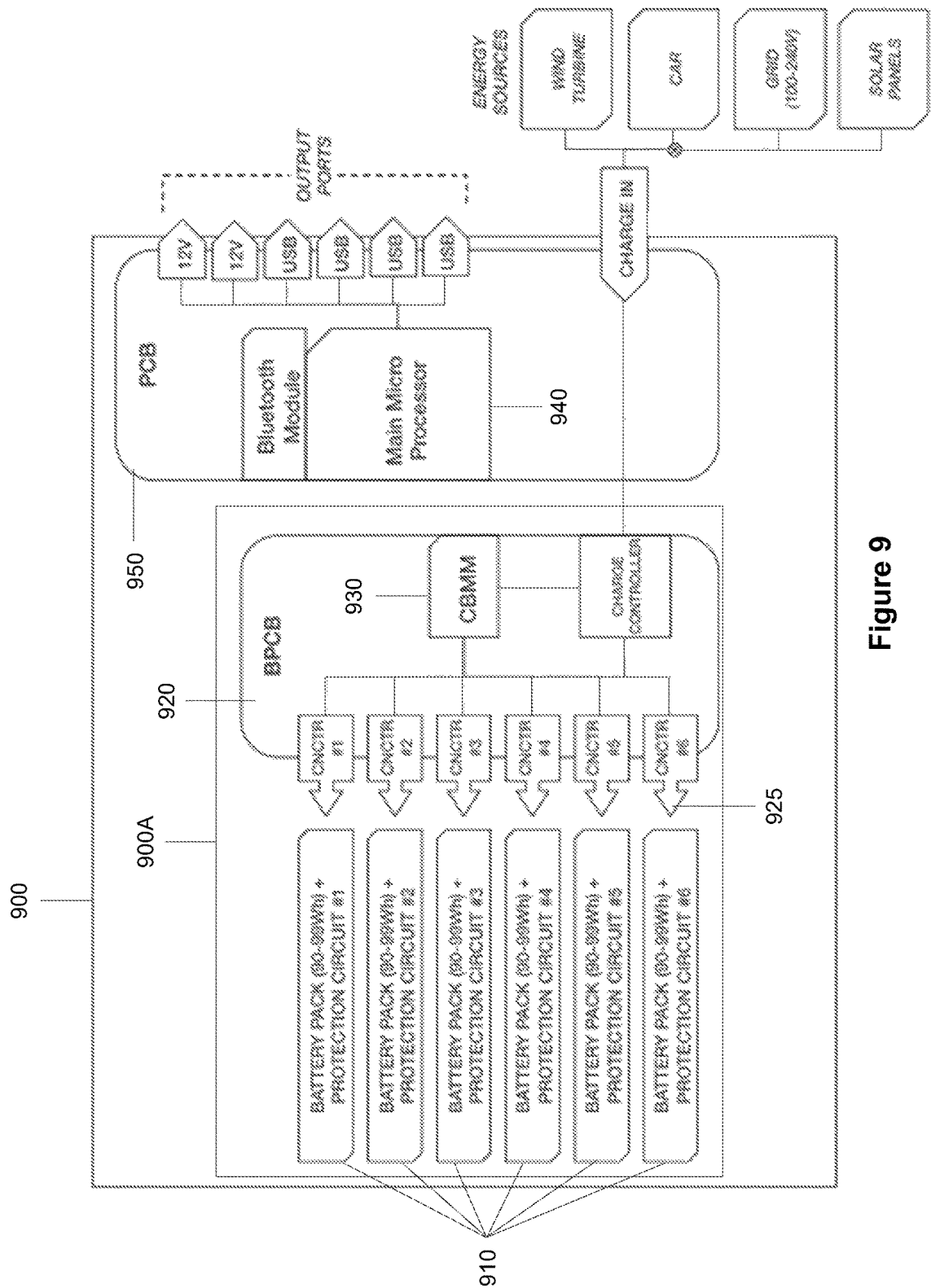
FIG. 9 shows a schematic view of the adjustable Energy Storage System according to some exemplary embodiments of the subject matter.

FIG. 9 shows a schematic view of the adjustable Energy Storage System (ESS) 900A hosted within the portable case 900, according to exemplary embodiments of the subject matter.

The adjustable Energy Storage System (ESS) comprises:
1. At least one battery pack 910 such as for example an ELI-0414 rechargeable battery available from http://www.epsilor.com/catalog/Rechargeable/ELI-0414/. Each battery pack 910 may comprise:
   a. one or more cells connected in series and parallel combination.
   b. Protection circuit—for overheat, overcharge, over-discharge and circuit break protection.
   c. Battery Management System (BMS), allowing readout, communication and monitoring of the electric parameters of the Pack. The BMS may hold information regarding the battery pack's chemistry, model, capacity, voltage, temperature, identification number, working hours, etc.
   d. An LED battery level gauge that provides, upon pressing, a readout and display of the voltage/amper levels of the pack.
   e. A connector that allows closing the electrical circuit for both using the stored energy and charging the rechargeable cells within the pack. The connector also allows the transfer of data via a communication connection, to the electrical components of the case.
   f. Fortified plastic shell.
2. According to exemplary embodiments of the subject matter, at least one of the battery packs, configured to be connected to the portable case, may be a non-rechargeable battery pack. In such a case, the BMS in each battery pack may also hold information regarding the battery pack's type (rechargeable or non-rechargeable). This information is configured to be transferred to the portable case. Alternatively, the portable case may recognize the battery pack type (rechargeable or non-rechargeable) by a physical characteristic of the battery pack (e.g. different shape, pins, holes, etc.). A Battery system Printed Circuit Board (BPCB) 920 holding all the needed battery packs male connectors 925 to connect to the central bus line holding the accumulated energy when using (discharging) the battery packs and when charging the battery packs from and external energy source (such as the solar panels of the case for example). The BPCB accepts N battery packs 910 attached to it via the connectors 925 and manages each battery pack individually. The BPCB can utilize one or many (N) battery packs sharing the same mechanical form-factor and same electrical interface. The BPCB provides flexibility as it is designed to work simultaneously with multiple battery packs having different chemistry and different electrical properties. for example, a typical configuration may comprise Zinc-air battery pack attached to the first connector, Li-Ion battery pack attached to the second connector and Lithium-Polymer battery pack attached to the fourth connector. Moreover the BPCB may be configured to deal with a combination of rechargeable and non-rechargeable battery packs. In such a case, when recharging the battery packs, the BPCB disconnects the non-rechargeable battery packs from the charging circle.

The BPCB eliminates the use of redundant cabling, and comprises a Central Battery Management Microprocessor (CBMM) 930. The CBMM 930 is a programmable microprocessor that reads all communications arriving from the connectors of the battery packs, processes this data and sends communication signals with processed data to the main microprocessor 940 residing on the main electronic PCB 950. The CBMM manages all battery packs connected to BPCB, supervises their charge/discharge cycles and monitors their status signals. The CBMM may also collect information and signals coming from each battery pack and store that information and signals to a non-volatile memory. Each battery pack communicates with the CBMM 930, using at least one pre-defined protocol. Examples of protocols may be: SMBus, I2C, SPI, USART, RS-232, RS-485, etc. The CBMM's functionality includes:
   a. Identify whether a battery pack is connected to any of the connectors on the BPCB.
   b. Identify each battery pack's type (rechargeable or non-rechargeable).
   c. Receive the signal reading the battery pack level (state of charge in case of a rechargeable battery pack) of each battery pack connected to the BPCB.
   d. Calculate the average battery packs level.
   e. Forward the battery pack level and the average battery packs level to the main microprocessor.
   f. Receive alerts from the battery packs—short circuit, overheat, overcharge and over-discharge.

g. Forward the alerts signals with an identifying locator to the main microprocessor.

h. Decide which battery packs to recharge (only the rechargeable ones).

During charge and discharge cycle the CBMM monitors each battery pack temperature and stops the charge/discharge cycle if the battery pack(s) condition deviates from normal operating ranges or compromises its integrity or when it receives alert signal from it. When the CBMM detects a battery pack malfunction it disconnects that battery pack from the central bus line.

According to embodiments of the invention, the battery packs' connectors, the BPCB or the CBMM may comprise a detector configured to detect the battery packs' physical characteristics (different shape, pins, holes, etc.).

In order to enable adding, removing or changing of battery packs the case interior 310 may be opened and enable access to the battery packs.

According to some exemplary embodiments of the subject matter, the battery level of each battery pack, the average battery packs level and the alerts informing of a short circuit, overheat, overcharge, over-discharge, etc. may be forwarded to be displayed on the user's mobile application via the enclosed Bluetooth/Wi-Fi transmitter/transceiver. For example, the user may be informed when a battery pack is exhausted, when adding an exhausted battery pack to the case by mistake, etc.

Figure 10:
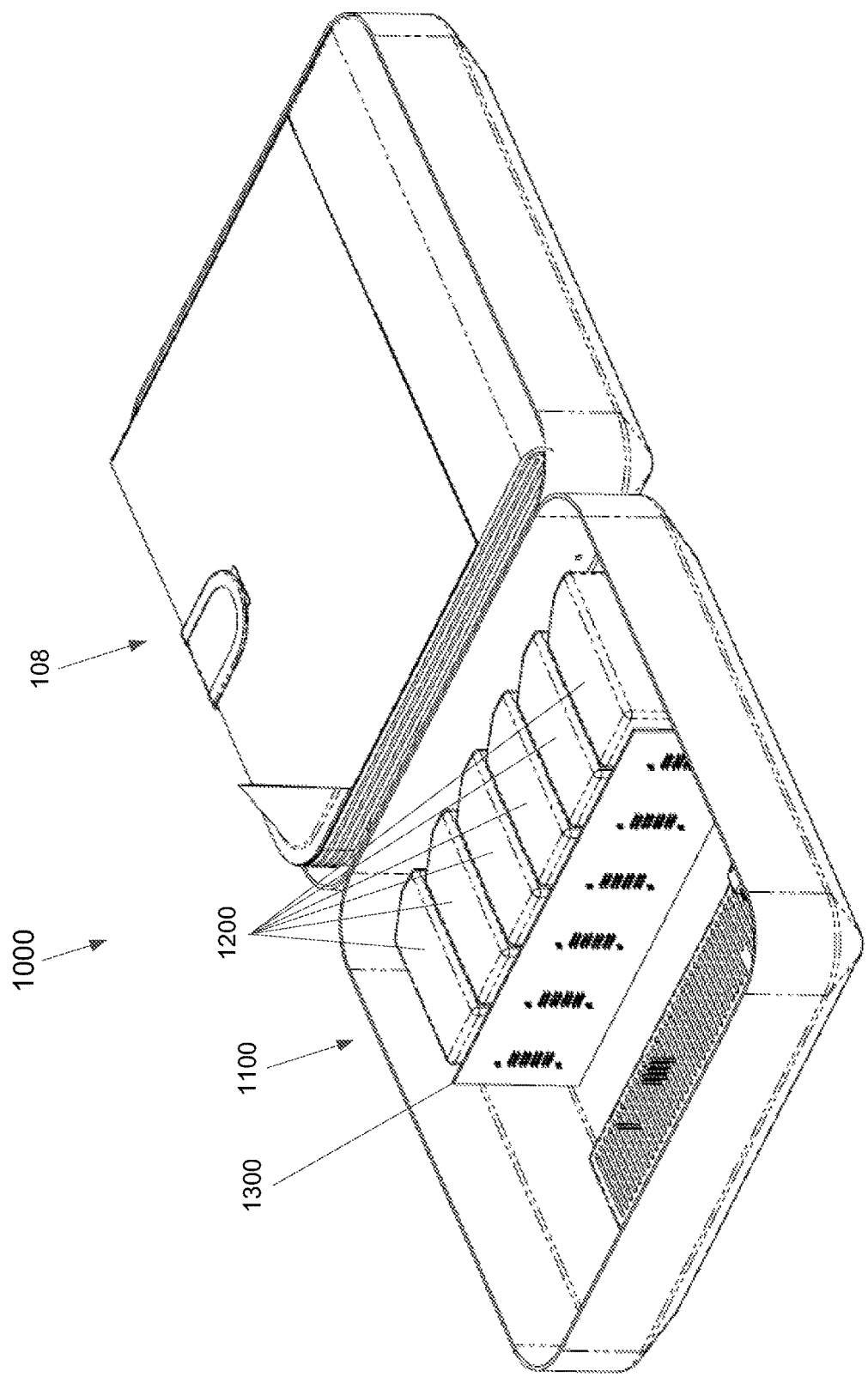
FIG. 10 shows a portable case hosting the adjustable Energy Storage System (ESS) of the present invention according to some exemplary embodiments of the subject matter.

FIG. 10 shows a portable case 1000 hosting the adjustable Energy Storage System (ESS) 1100 of the present invention. According to some exemplary embodiments of the subject matter, the ESS 1100 is hosted in one of the portable case's 1000 sides. The ESS may comprise, for example, 1-12 battery packs 1200 (6 are shown) which may be added and removed by the user. In this example, up to six battery packs may be connected on one side of the connectors plate 1300 and up to six battery packs on the other side of the plate. The recharging element (108 of FIG. 1) may be hosted in the other side of the portable case 1000. A cover (not shown) may cover the ESS' side of the case 1000.

According to some exemplary embodiments of the subject matter, more than one recharging element (108 of FIG. 1) may be connected to the portable case of the present invention via a connector. The connector connects the at least two recharging elements via a cable to the charging port of the portable case.

For example, in a case of two recharging elements, a T-connector allowing daisy-chaining of the recharging elements may be provided.

According to some exemplary embodiments of the subject matter, the portable case may include a weather-proof raincoat configured to enable proper operation of the case in any weather condition.

While the disclosure has been described with reference to exemplary embodiments, it will be understood by those skilled in the art that various changes may be made and equivalents may be substituted for elements thereof without departing from the scope of the subject matter. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this subject matter, but only by the claims that follow.

The invention claimed is:

1. A portable case, comprising:
a processor configured to control said portable case;
a charging port;
at least one output port;
an adjustable energy storage system comprising:
  a battery printed circuit board (BPCB) comprising:
    a plurality of battery packs connectors each comprises an electric connection and a communication connection;
    a plurality of battery packs each connected to one of said plurality of battery pack connectors; and
    a central battery management microprocessor (CBMM);
  said CBMM configured to:
  identify each of said plurality of battery packs connected to said plurality of battery pack connectors,
  receive a signal reading of each battery pack's voltage and ampere level via said communication connection,
  calculate an average battery pack voltage and ampere level based upon the signal level;
  after the calculate, decide which rechargeable battery pack to recharge,
  supervise said rechargeable battery packs' charge and discharge cycle including;
    monitor, during the charge and discharge cycle, each battery pack's temperature;
    stop the charge or discharge cycle if the temperature deviates from a predetermined temperature range,
  said CBMM further configured to disable battery packs identified as non-rechargeable during the charge cycle; and
  said plurality of battery packs configured to provide power to electronic appliances connected to said at least one output port;
a user interface configured to enable powering and monitoring of said portable case; and
a recharging element configured to be connected to said charging port and recharge at least one of said plurality of battery packs.

2. The portable case of claim 1, wherein said electronic appliances comprise at least one of smartphone, tablet, laptop, mobile device, PDA, emergency beacon and Wi-fi router.

3. The portable case of claim 1, wherein said at least one output port comprises at least one of USB port and 12V port.

4. The portable case of claim 1, further comprising a communication unit.

5. The portable case of claim 4, wherein said communication unit comprises a Bluetooth transceiver.

6. The portable case of claim 5, wherein said Bluetooth transceiver is configured to enable a mobile device running a user application to at least one of receive information regarding the portable case and control said portable case.

7. The portable case of claim 6, wherein said user application is further configured to instruct a user how to place said recharging element.

8. The portable case of claim 4, wherein said communication unit comprises a Wi-Fi transceiver.

9. The portable case of claim 8, wherein said Wi-Fi transceiver is configured to at least one of receive information regarding the portable case, create a cellular Wi-Fi hot-spot and control said portable case.

10. The portable case of claim 1, further comprising an emergency beacon configured to at least one of transmit an emergency signal and activate a light.

11. The portable case of claim 1, wherein at least one of said battery packs is rechargeable and wherein said recharging element comprises at least one solar panel configured to recharge said at least one rechargeable battery packs using solar power.

12. The portable case of claim 11, further comprising at least one universal fixture for aligning said at least one solar panel at an optimal angle towards the sun.

13. The portable case of claim 11, wherein said at least one solar panel is foldable.

14. The portable case of claim 1, wherein at least one of said battery packs is rechargeable and wherein said recharging element comprises at least one wind turbine configured to recharge said at least one rechargeable battery packs using wind power.

15. The portable case of claim 14, further comprising a turbine fixture configured to enable placing said wind turbine at adjustable heights and withstanding strong winds.

16. The portable case of claim 14, wherein said at least one wind turbine further comprises a handle configured to enable rotating said wind turbine manually.

17. The portable case of claim 1, wherein at least one of said battery packs is rechargeable and wherein said recharging element comprises at least one hand-crank generator configured to recharge said at least one rechargeable battery packs.

18. The portable case of claim 1, wherein said plurality of batteries are configured to be added and removed from said portable case as needed.

19. The portable case of claim 1, wherein said CBMM is further configured to
receive alerts from said plurality of battery packs.

20. The portable case of claim 19, wherein said alerts comprise at least one of short circuit, overheat, overcharge and over-discharge.

21. The adjustable energy storage system of claim 1, wherein said plurality of battery pack connectors comprise a first number of battery pack connectors; and wherein said CBMM configured to enable connection of a second number of battery packs to said first number of battery pack connectors; wherein said first number is greater than said second number.

22. An adjustable energy storage system, comprising:
a battery printed circuit board (BPCB) comprising:
　a plurality of battery packs connectors each comprises an electric connection and a communication connection;
　a plurality of battery packs each connected to one of said plurality of battery pack connectors; and
　a central battery management microprocessor (CBMM);
said CBMM configured to:
identify each of said plurality of battery packs connected to said plurality of battery pack connectors,
receive a signal reading of each battery pack's voltage and ampere level via said communication connection,
decide which battery packs identified as rechargeable to recharge,
supervise said rechargeable battery packs' charge and discharge cycle;
said CBMM further configured to disable recharging battery packs identified as non-rechargeable.

23. A portable case, comprising:
a processor configured to control said portable case;
a charging port;
at least one output port;
a user interface configured to enable powering and monitoring said portable case; and
an adjustable energy storage system;
the adjustable energy storage system comprising:
　a battery printed circuit board (BPCB) including
　　a plurality of battery packs connectors each comprises an electric connection and a communication connection;
　　a plurality of battery packs each connected to one of said plurality of battery pack connectors; and
　a central battery management microprocessor (CBMM) configured to
　　identify each of said plurality of battery packs connected to said plurality of battery pack connectors,
　　receive a signal reading of each battery pack's voltage and ampere level via said communication connection,
　　decide which battery packs identified as rechargeable to recharge, and
　　supervise said rechargeable battery packs' charge and discharge cycle; said CBMM further configured to disable recharging battery packs identified as non-rechargeable,
said battery packs identified as rechargeable are configured to be recharged by a recharging element configured to be connected to said charging port;
said plurality of battery packs configured to provide power to electronic appliances connected to said at least one output port.

* * * * *